March 30, 1937. W. T. MURDEN 2,075,745
BEARING MOUNTING
Filed Dec. 12, 1932

INVENTOR:
WILLIAM T MURDEN,
BY
HIS ATTORNEY

Patented Mar. 30, 1937

2,075,745

UNITED STATES PATENT OFFICE 2,075,745

BEARING MOUNTING

William T. Murden, Forestville, Conn., assignor, by mesne assignments, to General Motors Corporation, Detroit, Mich., a corporation of Delaware Application December 12, 1932, Serial No. 646,821

3 Claims. (Cl. 74—500)

This invention relates to bearing mountings and comprises all of the features of novelty herein disclosed.

An object of the invention is to provide an improved mounting for roller followers, especially such as are used in connection with worms as a substitute for the conventional worm wheel. Heretofore these roller followers have been mounted so that the bore of the roller fits directly on a tie bolt, the roller turning on the bolt which thereby carries the radial components of the external load. It has been intended in such mountings that the thrust loads and tilting couples would be carried by separate thrust washers. It has been found in such devices that the roller bore wears into the tie bolt, especially when endwise looseness develops. In the case of automobile steering apparatus, this developed looseness finally results in locking or jamming of the roller, which becomes an extremely dangerous condition. In the mounting herein disclosed, all radial, thrust or tilting loads are carried by two rows of balls, thus eliminating any rubbing between the roller and bolt and insuring against developed looseness, and the disposition of the contact angles is such as to insure maximum rigidity.

Figure 1:
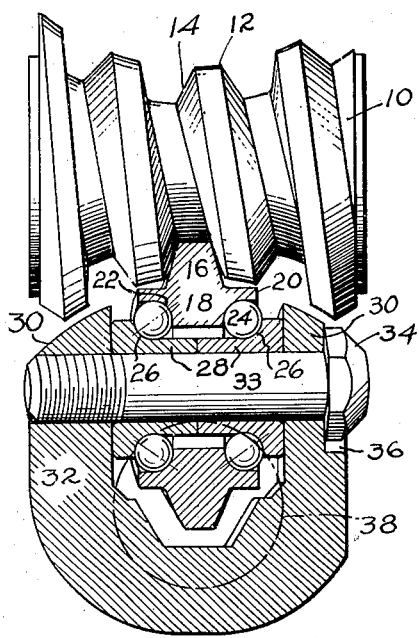
Fig. 1 is a sectional view of the mounting.
Figure 2:
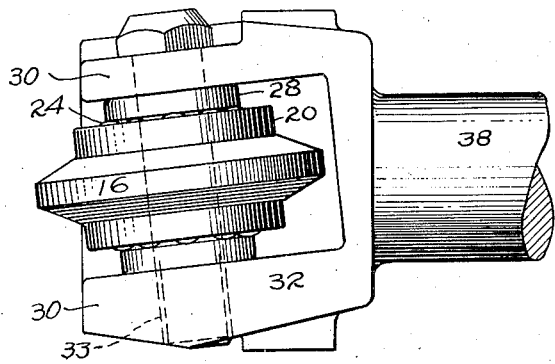
Fig. 2 is an elevation.
Figure 3:
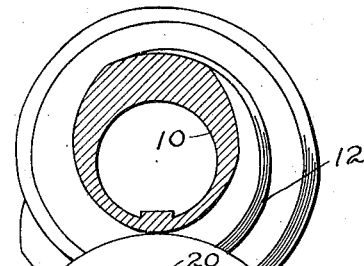
Fig. 3 is a side view of the mounting together with certain related members some of which are broken away or in section.
Figure 3:
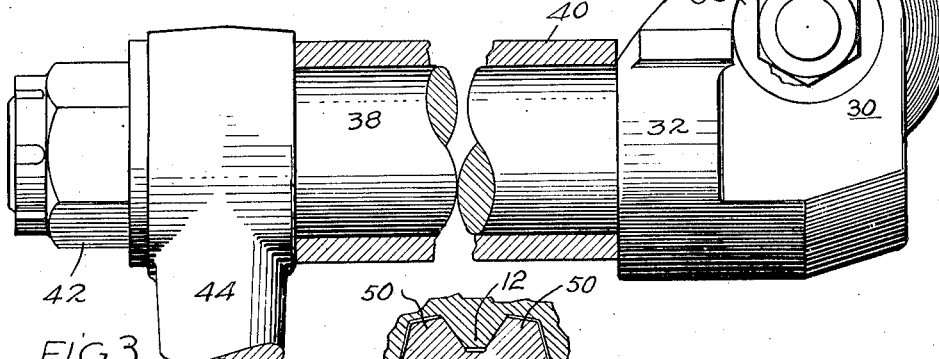

The numeral 10 indicates a hollow worm adapted for application to a steering column or other actuating-member. The worm is shown as of the hour-glass type with a thread 12 having flanks 14 between which an annular tooth or rib 16 projects from a rotary hub member 18. The hub member has tubular extensions 20 and is provided with two angular contact raceways 22 for rolling elements 24 which also run on opposed angular contact raceways 26 of inner race rings 28. The inner race rings abut against one another and each engages a yieldable arm 30 of a swinging yoke 32. A supporting and clamping bolt 33 passes through the race rings and through the arms of the yoke, one end of the bolt preferably being threaded in one arm and the other end of the bolt having a head 34 in a recess 36 of the other arm. When the bolt is screwed home, the arms are clamped against the race rings and the race rings are clamped in firm abutting relation without leaving any lost motion at the rolling elements. The abutting of the rings also prevents cramping or overloading of the rolling elements. The tooth 16 has rolling contact with the worm and swings with the yoke. The load on the bearings is chiefly thrust with some induced radial load and the angular contact raceways resist both and firmly support the rotary tooth in accurate meshing relation to the worm thread.

It will be noted that the yoke 32 and the tooth or rib 16 are inclined to the axis of the worm to compensate for the pitch of the threads and that the yoke can swing about an axis provided by a stud 38 which is similarly inclined with respect to the yoke arms. Rotation of the worm swings the yoke and turns the stud 38 in any suitable bearing sleeve 40. The parts actuated may be variously constituted but, in the illustrated environment, a rock arm 44 is clamped on the stud by a nut 42 and is provided with a ball 46, as for connection with the drag link of a motorvehicle, which shifts the wheels that constitute the members actuated from the steering column.

Figure 4:
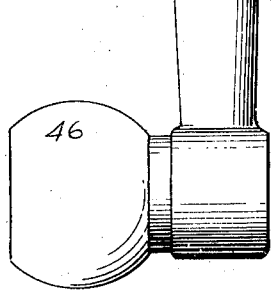
Fig. 4 is a sectional view of a modification.
Figure 4:
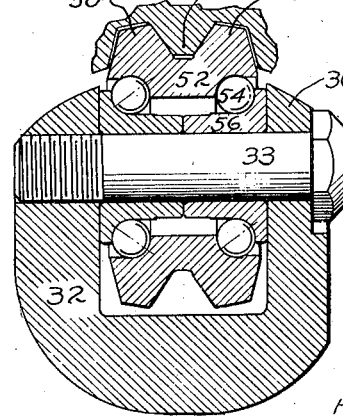

In Fig. 4, two annular ribs or teeth 50 on a hub member 52 straddle the worm thread 12 to engage the flanks thereof. The ribs provide more material and strength outside of the rolling element 54. Inner race rings 56 are clamped together by a bolt as in Fig. 1.

I claim:

1. A toothed worm follower assembly for use in automobile steering gear and the like comprising an outer race member having an annular tooth on the outer surface thereof, angular contact raceways in said outer race member, a pair of inner race members extending within the outer race member and each provided with an angular contact raceway cooperating with one of the first named raceways, anti-friction members in said raceways, and means for holding said inner race members in abutment, said inner race members being of such length that when their inner ends are brought into abutment all lost motion in the bearing is taken up and there is insurance against looseness in the bearing under both radial and thrust loads, and yet the said abutment of said inner race members prevents cramping or overloading in assembling.

2. A toothed worm follower assembly for use in automobile steering gear and the like comprising a one-piece outer race member having an annular tooth integrally formed on the outer surface thereof, angular contact raceways formed in the ends of said outer race member, a pair of inner race members extending within the outer race member and each provided at its outer end with an angular contact raceway cooperating with one of the first named raceways, said raceways being curved in cross section, curved anti-friction members in said raceways, and means for holding said inner race members in abutment, said inner race members being of such length that when their inner ends are brought into abutment all lost motion in the bearing is taken up and there is insurance against looseness in the bearing under both radial and thrust loads, and yet the said abutment of said inner race members prevents cramping or overloading in assembling.

3. A toothed worm follower assembly for use in automobile steering gear and the like comprising a one-piece outer race member having an annular tooth integrally formed on the outer surface thereof, angular contact raceways formed in the ends of said outer race member, a pair of inner race members extending within the outer race member and each provided at its outer end with an angular contact raceway cooperating with one of the first named raceways, said raceways being curved in cross section, curved anti-friction members in said raceways, a member having a forked portion straddling said race members, and a clamping bolt extending through said forked portion and said race members and adapted to hold the adjacent inner ends of said inner race members in engagement, said inner race members being of such length that when their inner ends are brought into abutment all lost motion in the bearing is taken up and there is insurance against looseness in the bearing under both radial and thrust loads, and yet the said abutment of said inner race members prevents cramping or overloading in assembling.

WILLIAM T. MURDEN.